G. P. GREGORY.
POTATO VINE CUTTER.
APPLICATION FILED MAY 29, 1907.

941,247.

Patented Nov. 23, 1909.

Witnesses:

Inventor
George P. Gregory,
by
Atty.

UNITED STATES PATENT OFFICE.

GEORGE P. GREGORY, OF BLACKSHEAR, GEORGIA.

POTATO-VINE CUTTER.

941,247. Specification of Letters Patent. Patented Nov. 23, 1909.

Application filed May 29, 1907. Serial No. 376,333.

*To all whom it may concern:*

Be it known that I, GEORGE P. GREGORY, a citizen of the United States, residing at Blackshear, in the county of Pierce and State of Georgia, have invented certain new and useful Improvements in Potato-Vine Cutters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to vine cutters, and has for its object to provide a construction of vine cutter adapted to be attached to an ordinary plow or potato digger stock, and readily detached therefrom when to be replaced by a plow point for digging potatoes after the potato vines have been cut.

It comprises two cutters each having a convex edge, and the two connected together by a cross-bar through which may be passed a bolt for attaching the cutter to the plow stock. The shape of the cutters effectively cuts or severs the vines on opposite sides of the row or ridge by a sort of draw-cut and prevents the vines from becoming entangled about the cutters.

Figure 1:
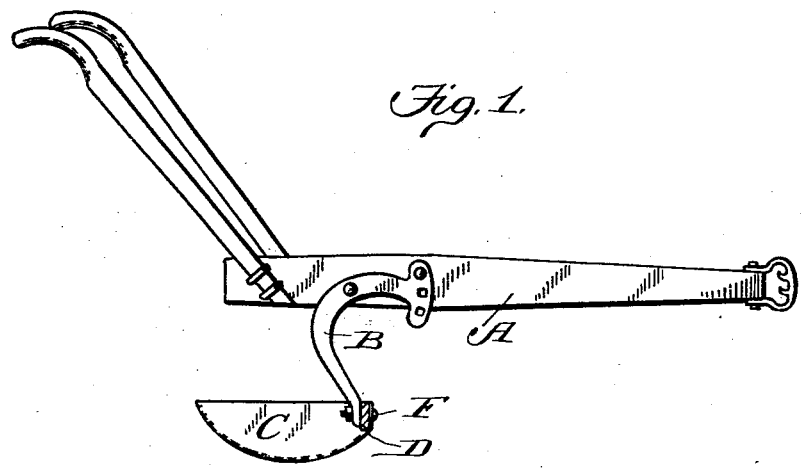
Figure 2:
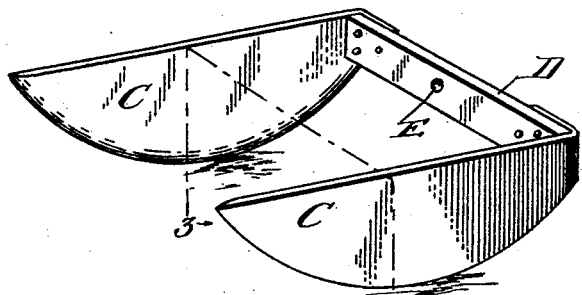
Figure 3:
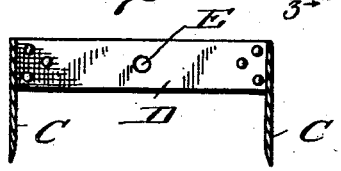

In the accompanying drawing, Figure 1 is a perspective of a plow beam and stock of ordinary construction and having the cutter attached thereto; Fig. 2 is a perspective of the cutter detached from the plow stock; and Fig. 3 a cross section through the cutter.

In the drawing, the letter A designates a plow beam and B its stock, which parts may be of any approved form of construction. The cutter consists of the two blades C each having a convex under face or edge as shown and which may be sharpened to any extent desired, the blades being connected one to the other by a cross bar D which will have a centrally disposed hole E through which may be passed a bolt F for attaching the cutter to the plow stock B. These cutters in practice will be sufficiently spaced apart from each other that they will lie, one on each side of the row or ridge of potatoes, so that when the cutter is drawn along the row or ridge the vines on each side thereof will be cut, and thus have the ridge in good condition for the potato digger to more effectually perform its work without interference from attached vines. After the vines have been cut, the vine cutter may be easily and quickly detached by removing the bolt and then the cutter may be replaced with the plow point or digger.

An advantage in having a convex cutting edge to the cutters is that the vines are not so liable to become entangled about the cutting blades, and furthermore a rocking motion may be given to the cutter by pressure applied to the beam-handles, thus to better advantage regulating the depth of cut, and enabling the blades to ride over any abnormal obstruction in the path of travel of the cutter, and as before stated giving a draw-cut to the blades in their travel along the potato ridge.

The device is simple in construction, inexpensive to manufacture, can be readily applied without any change in the plow stock of ordinary construction and can be as readily detached when to be replaced with a plow point for digging the potatoes after the vines have been cut.

Having described my invention and set forth its merits, what I claim is:—

1. A vine-cutter comprising two oppositely disposed blades and a transverse member adapted to connect said blades in relative cutting position on a plow-stock, said blades being connected to the plow-stock near its rear end to support the stock and being formed with substantially arc-shaped cutting-edges, whereby a draw-cut and rocking-motion may be imparted.

2. A vine-cutter comprising oppositely disposed and connected cutter-blades adapted to be mounted on a plow-stock, said cutter-blades connected to the stock near its rear to support the stock and comprising substantially segmental disks, having their peripheries provided with cutting edges.

3. A vine-cutter comprising a pair of cutter-blades mounted on a plow-stock near its rear end to support the same and to ride one on each side of a row or ridge, said cutter-blades comprising substantially segmental disks sharpened along their peripheries and extending rearwardly from their point of support and parallel to the line of draft, whereby a straight draw-cut may be imparted to each side of the row.

In testimony whereof I affix my signature in presence of two witnesses.

GEORGE P. GREGORY.

Witnesses:
P. L. POMEROY,
J. T. BRANTLEY.